Dec. 19, 1950     L. ROSENSTEIN     2,534,298
PRODUCTION OF SODIUM CARBONATE
Filed July 12, 1947
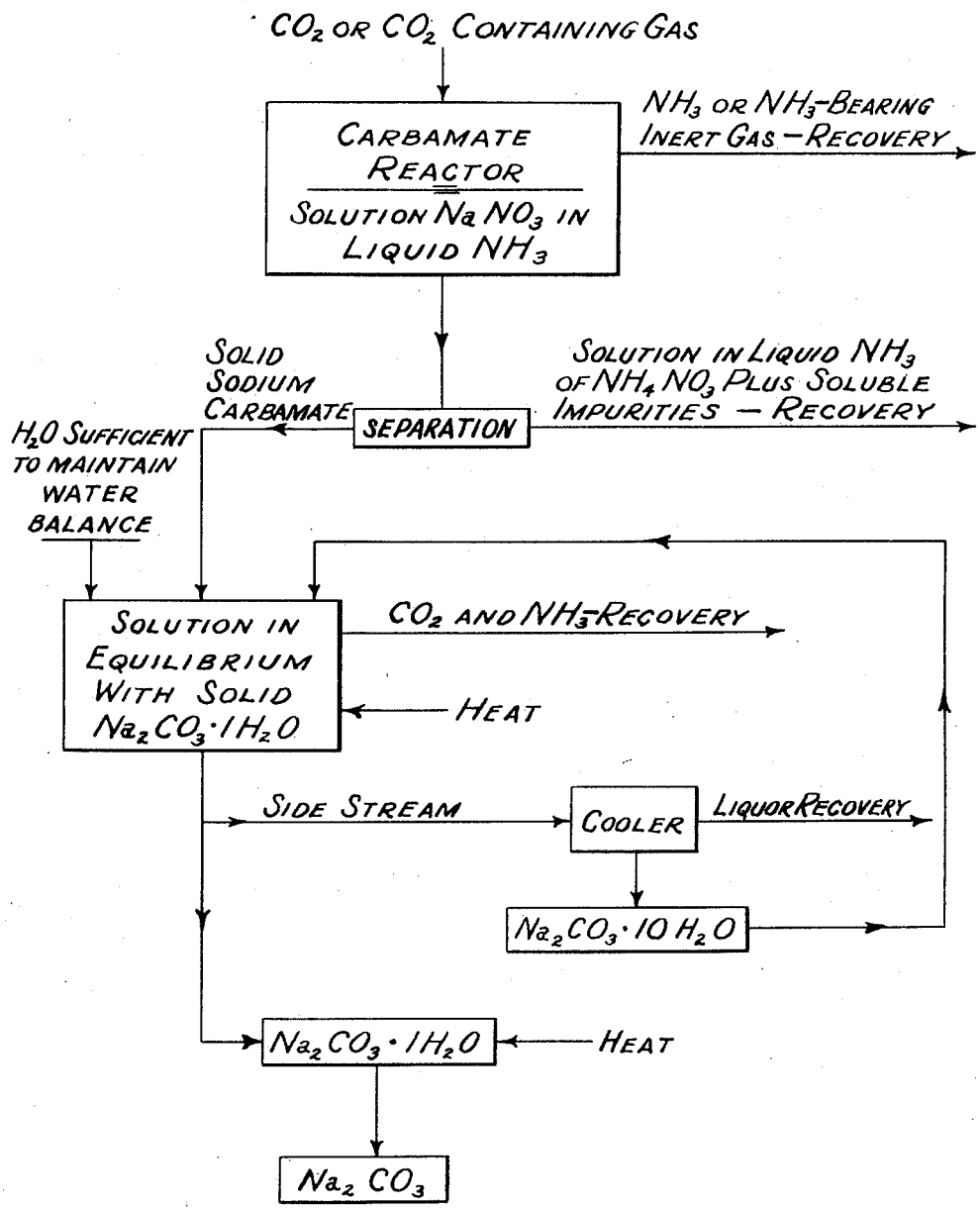
INVENTOR.
LUDWIG ROSENSTEIN
BY
Charles M. Fryer
ATTORNEY Patented Dec. 19, 1950

2,534,298

UNITED STATES PATENT OFFICE 2,534,298

PRODUCTION OF SODIUM CARBONATE

Ludwig Rosenstein, New York, N. Y.

Application July 12, 1947, Serial No. 760,567

1 Claim. (Cl. 23—63)

My invention relates to the production of sodium carbonate, and more particularly to the production of sodium carbonate from sodium carbamate.

A well known process for making sodium carbonate is the Solvay process which reacts aqueous solutions of sodium chloride with ammonia and carbon dioxide. Because of the dependence of such process on aqueous solutions, the volumes of which become very large for a given production, Solvay plants are necessarily very large and very expensive per unit of production. Besides, calcium chloride is a by-product of the Solvay process; and a large proportion of such calcium chloride must be discarded, thus becoming a nuisance in the neighborhood of most Solvay plants.

My invention is designed to obviate the foregoing problems, and has as its objects, among others, the provision of an improved process for the production of substantially pure sodium carbonate which can be conducted in a relatively small plant because it does not require relatively large volumes of water, which has very little if any obnoxious waste products, and which at the same time is relatively simple and economical, and can be conducted on a continuous basis. Other objects of my invention will become apparent from a perusal of the following description.

The accompanying drawing is a flow-sheet of the process of my invention in its preferred form, and employing my preferred starting materials.

In general, my process comprises the production of sodium carbamate which is subsequently hydrolyzed; the conditions of hydrolysis being so controlled as to effect crystallization of sodium carbonate monohydrate from the solution. The formation of sodium carbonate monohydrate is an important feature of my invention because such procedure insures a desirable salt for the production of anhydrous sodium carbonate or soda-ash, without imposing an excessive water load when conversion of the hydrated salt to anhydrous sodium carbonate is effected, as would otherwise be the case with respect to higher hydrated salts of sodium carbonate.

While the hydrolysis of sodium carbamate to form sodium carbonate is broadly referred to in the patent art, I have found that unless such hydrolysis is conducted under the controlled conditions more fully discussed hereinafter, it can yield other products than sodium carbonate, depending on the conditions of hydrolysis. These other products are undesirable when substantially pure sodium carbonate as an end product and the most economical operations are the aims.

As one example, hydrolysis of sodium carbamate can yield sodium bicarbonate whose conversion to sodium carbonate must be accompanied by recovery and recycle of carbon dioxide, which adds complications in plant construction, operation, and economy. As a second example, application of heat to sodium carbamate can cause a side-reaction to form sodium cyanate, as follows:

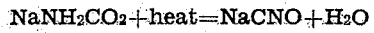

$$NaNH_2CO_2 + heat = NaCNO + H_2O$$

Any sodium cyanate formed in continuous operation would have to be removed from the circulating solutions to prevent its accumulation and contamination of the end-product.

Urea can also form on application of heat according to the following reaction:

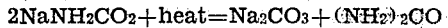

$$2NaNH_2CO_2 + heat = Na_2CO_3 + (NH_2)_2CO$$

and any urea formed will accumulate as an impurity.

When hydrolysis of sodium carbamate is carried on in aqueous solution at sufficiently high temperature, only sodium carbonate is formed; and if the aqueous solution is kept constantly at the saturation point with respect to solid-phase sodium carbonate monohydrate, then this crystal-form precipitates at once as a solid and in very pure form. Thus evaporation of solution to effect recovery is avoided, and no recrystallization or other purification process need be applied to the solid sodium carbonate monohydrate to attain soda-ash of commercial grade.

Methods of producing sodium carbamate are well known as are described in the patents to Mittasch et al. No. 1,948,002, February 20, 1934; Thorssell et al. No. 2,002,681, May 28, 1935; and Stock No. 2,014,512, September 17, 1935; and any suitable method may be employed in my process for the production of the sodium carbamate. However, I preferably produce the sodium carbamate by reaction of liquid substantially anhydrous ammonia, carbon dioxide or a suitable carbon dioxide containing gas (hereinafter both referred to generically as carbon dioxide), and sodium nitrate dissolved in such liquid ammonia. This is so because upon separation of the sodium carbamate from the reaction vessel, the filtrate and washings resulting from the sodium carbamate production, provide a source of ammonium nitrate which is a valuable commercial product useful as a fertilizer, among other purposes. Such ammonium nitrate may be recovered by simply evaporating the ammonia, and returning it as a recycle. It is also practical to market the solution of ammonium nitrate in ammonia for fertilizer use as such with or without the addition of water.

The reaction which occurs is as follows:

$$NaNO_3 + 2NH_3 + CO_2 = NaNH_2CO_2 + NH_4NO_3$$

Although it is preferred to obtain the reaction by dissolving the sodium nitrate in liquid ammonia, and passing the carbon dioxide into the solution, the carbon dioxide can just as well be absorbed separately in liquid ammonia, forming a solution of ammonium carbamate which is soluble in liquid ammonia, to which is added or which is added to a solution of sodium nitrate in liquid ammonia, resulting in substantially quantitative precipitation of sodium carbamate. In either case, the reaction can be conducted in a suitable pressure vessel from which inert gases bearing ammonia can be kept under control for recovery and recycle. Since the reaction with carbon dioxide evolves heat, cooling at the carbamate reactor is desirable.

Instead of sodium nitrate as the source of the sodium salt, any other suitable sodium salt soluble in liquid ammonia may be utilized in its place, such as sodium chloride. However, sodium chloride is not as desirable as sodium nitrate because sodium nitrate is far more soluble in liquid ammonia. Consequently, less volumes of solution are necessary, and hence the plant size becomes much smaller and less costly per unit of production. Also, the nitrate solutions have a much lower vapor pressure of ammonia, and can, consequently, be handled with greater ease and in lighter vessels. Furthermore, sodium chloride and other sodium salts soluble in liquid ammonia do not produce the valuable byproduct, ammonium nitrate, which can be used as a fertilizer.

The sodium carbamate is precipitated in the carbamate reactor in a form which filters readily, and can be easily washed with liquid ammonia to free it from adhering nitrate salts. Hence, separation of the sodium carbamate from the reacting materials may be readily effected. After separation of the sodium carbamate from the carbamate reactor, it together with water is continually or continuously introduced into another vessel wherein it is hydrolyzed under such controlled conditions as to produce continuously sodium carbonate monohydrate which is the only stable, solid crystalline form of sodium carbonate in the solution; the hydrolysis decomposition being represented as follows:

$$2NaNH_2CO_2 + H_2O = Na_2CO_3 + 2NH_3 + CO_2$$

Sodium carbonate crystallizes as salts having different quantities of water of crystallization, such as sodium carbonate monohydrate $$(Na_2CO_3.H_2O)$$

sodium carbonate heptahydrate $(Na_2CO_3.7H_2O)$, and sodium carbonate decahydrate $$(Na_2CO_3.10H_2O)$$

By controlling the hydrolysis conditions of the sodium carbamate, so that crystallization of substantially only the monohydrate is effected, a minimum water load is imposed on the next step of conversion of the hydrated sodium carbonate to anhydrous sodium carbonate or soda-ash, by application of heat. Such hydrolysis control is, preferably, accomplished by having the temperature of the carbamate hydrolysis solution such as to favor formation of the sodium carbonate monohydrate so that it will crystallize from a saturated solution thereof, and by so controlling the water balance of the solution by adjustment of the quantity of water fed thereto, as to cause it to be in equilibrium with sodium carbonate monohydrate, or in other words, saturated with respect to the monohydrate.

The sodium carbonate monohydrate formation, and crystallization from a saturated solution thereof, will occur at an elevated temperature of approximately thirty-two degrees centigrade (32° C.) and above. In a short range below this temperature, the heptahydrate will form, while at still lower temperatures the decahydrate will form. Hence, this conversion of the sodium carbamate to the sodium carbonate monohydrate should be at a temperature well above the critical temperature. However, to insure formation of the desired monohydrate, I preferably carry out the conversion of the carbamate to the sodium carbonate monohydrate by applying heat to the solution to maintain it at its boiling point. This could be done in a vessel at atmospheric pressure, but to hasten the reaction and also to reduce the size of the vessel, I prefer to conduct the decomposition in a closed vessel at super-atmospheric pressure in which the solution is maintained at its boiling point by application of heat. For example, a pressure of about fifty (50) pounds per square inch is satisfactory, but the actual pressure chosen will depend upon the residence time allowed; the higher the pressure and the corresponding temperature, the faster the reaction.

In any event, it is only important while the crystals of sodium carbonate monohydrate are in contact with the aqueous solution, that the temperature be maintained above the transition temperature of the monohydrate to any of the higher hydrates of the sodium carbonate. Formation of such higher hydrate is not only undesirable because of the imposition of an unnecessary water load in the conversion step to the anhydrous sodium carbonate, which is effected by application of heat, but also because of the well known cementing tendency of such higher hydrate.

To maintain the solution saturated with respect to the sodium carbonate monohydrate, and thus cause continual crystallization of such salt, the quantity of water continually fed into the carbamate decomposition reaction vessel must be so controlled or adjusted as to maintain the proper water balance for formation of the sodium carbonate monohydrate. As noted from the decomposition reaction, ammonia and carbon dioxide are formed; also water vapor will necessarily evolve, and the formation of sodium carbonate monohydrate takes up water and will have adherent water. These quantities of water leave the vessel. The ammonia and carbon dioxide are recovered for recycle in any suitable equipment as illustrated on the flow-sheet.

The crystalline sodium carbonate monohydrate remains in suspension, and is continually removed in any suitable manner, such as by passing the suspension through settling tanks, and eventually filtering. Transformation of the sodium carbonate monohydrate to the anhydrous sodium carbonate, or soda-ash, can be readily accomplished by simply driving off the water of crystallization, by application of heat to any suitable vessel into which the monohydrate is introduced and in which the contents are preferably maintained under agitation. The specific manner of applying the heat and the degree of agitation during the heating determine the density of the final product to a considerable extent.

Although the described method will effect crystallization of sodium carbonate monohydrate in substantially pure form, ammonia soluble impurities from the raw materials will gradually accumulate in the sodium carbonate liquor in the carbamate decomposition vessel, and may become occluded in the monohydrate crystals. My method, however, presents a convenient way for obviating such occlusion, as I prevent accumulation of such impurities in the solution, by continually removing portions thereof. Sodium carbonate is recovered from the removed portions by passage thereof to a suitable cooler maintained at a temperature at which a hydrate of sodium carbonate higher than the monohydrate, crystallizes, which is a temperature of approximately thirty-two degrees centigrade (32° C.) and below, and returning the higher hydrate to the carbamate decomposition vessel while maintaining the previously described water balance therein. Preferably, the cooling is to a temperature well below the critical temperature of approximately thirty-two degrees centigrade (32° C.) so that the higher hydrate which crystallizes is sodium carbonate decahydrate.

The liquor from the cooler which will still contain sodium carbonate is suitable for the production of caustic soda by reaction with lime, in any suitable manner, or if desired, additional sodium carbonate decahydrate can be recovered from such liquor upon leaving the cooler, by cooling the less concentrated liquor to still lower temperatures.

For convenience, I prefer to effect removal of the impurities by continuously tapping off a side stream of the monohydrate suspension as it leaves the carbamate decomposition vessel, as is illustrated by the flow-sheet.

I claim:

A continuous method of preparing substantially pure anhydrous sodium carbonate which comprises continually introducing sodium carbamate and water into a saturated aqueous solution of sodium carbonate to effect hydrolysis of said sodium carbamate whereby sodium carbonate monohydrate is the only solid product of hydrolysis; maintaining said solution saturated with respect to said sodium carbonate monohydrate to maintain solid phase sodium carbonate monohydrate continually suspended in said solution, by so controlling the quantity of water introduced as to cause said solution to be continually in equilibrium with said solid phase sodium carbonate monohydrate; applying heat to said solution while said sodium carbamate and water are being introduced to maintain the solution above 32.0° C. to thereby effect direct one-step crystallization of substantially only solid sodium carbonate monohydrate from said saturated solution; continually removing crystallized sodium carbonate monohydrate from the solution; and converting said removed sodium carbonate monohydrate to anhydrous sodium carbonate by application of heat.

LUDWIG ROSENSTEIN.

REFERENCES CITED

The following references are of record in the file of this patent:

UNITED STATES PATENTS

| Number | Name | Date |
| --- | --- | --- |
| 1,980,691 | MacMullin | Nov. 13, 1934 |
| 2,002,681 | Thorssell et al. | May 28, 1935 |
| 2,003,378 | MacMullin | June 4, 1935 |
| 2,005,868 | MacMullin | June 25, 1935 |
| 2,014,512 | Stock | Sept. 17, 1935 |
| 2,014,536 | MacMullin | Sept. 17, 1935 |
| 2,026,714 | Thompson et al. | Jan. 7, 1936 |
| 2,133,455 | Keene et al. | Oct. 18, 1938 |
| 2,161,711 | Keep et al. | June 6, 1939 |

OTHER REFERENCES

McPherson and Henderson, "General Chemistry," page 518, 3rd ed., Ginn & Co., Boston.

"Industrial and Engineering Chemistry," vol. 35, No. 9, Sept. 1943, article entitled "Autoclave for Pressure-Temperature Reactions," pages 927, 930.